United States Patent
Tan et al.

(10) Patent No.: US 9,008,446 B2
(45) Date of Patent: *Apr. 14, 2015

(54) INTERACTIVE CONCEPT LEARNING IN IMAGE SEARCH

(75) Inventors: Desney S. Tan, Kirkland, WA (US);
Ashish Kapoor, Kirkland, WA (US);
Simon A. J. Winder, Seattle, WA (US);
James A. Fogarty, Seattle, WA (US)

(73) Assignee: Microsoft Technology Licensing, LLP, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,342

(22) Filed: Mar. 24, 2012

(65) Prior Publication Data
US 2012/0183206 A1    Jul. 19, 2012

Related U.S. Application Data

(62) Division of application No. 11/954,246, filed on Dec. 12, 2007, now Pat. No. 8,165,406.

(51) Int. Cl.
*G06K 9/62* (2006.01)
*G06F 17/30* (2006.01)

(52) U.S. Cl.
CPC ........ *G06F 17/30247* (2013.01); *G06K 9/6215* (2013.01)

(58) Field of Classification Search
CPC .................................................. G06F 17/30247
USPC .................. 382/224, 155, 118, 305, 190, 100
See application file for complete search history.

(56) References Cited

U.S. PATENT DOCUMENTS

| | | | | |
|---|---|---|---|---|
| 2004/0073543 | A1* | 4/2004 | Kim et al. | 707/3 |
| 2005/0055344 | A1* | 3/2005 | Liu et al. | 707/3 |
| 2006/0112092 | A1* | 5/2006 | Ziou et al. | 707/5 |
| 2006/0248044 | A1* | 11/2006 | Zhang et al. | 707/1 |
| 2007/0217676 | A1* | 9/2007 | Grauman et al. | 382/170 |
| 2008/0046424 | A1* | 2/2008 | Horton | 707/6 |

FOREIGN PATENT DOCUMENTS

| | | |
|---|---|---|
| JP | 09-101970 | 4/1997 |
| JP | 11-039325 | 2/1999 |
| JP | 2000-048041 | 2/2000 |
| JP | 2002-197117 | 7/2002 |
| JP | 2006-39658 | 2/2006 |
| JP | 2007-242065 | 9/2007 |

* cited by examiner

*Primary Examiner* — Mike Rahmjoo
(74) *Attorney, Agent, or Firm* — Steve Wight; Judy Yee; Micky Minhas (57) ABSTRACT

An interactive concept learning image search technique that allows end-users to quickly create their own rules for re-ranking images based on the image characteristics of the images. The image characteristics can include visual characteristics as well as semantic features or characteristics, or may include a combination of both. End-users can then rank or re-rank any current or future image search results according to their rule or rules. End-users provide examples of images each rule should match and examples of images the rule should reject. The technique learns the common image characteristics of the examples, and any current or future image search results can then be ranked or re-ranked according to the learned rules.

18 Claims, 5 Drawing Sheets

INTERACTIVE CONCEPT LEARNING IN IMAGE SEARCH

This is a division of prior application Ser. No. 11/954,246 entitled "Interactive Concept Learning in Image Search" and filed Dec. 12, 2007.

BACKGROUND

There is growing interest in image retrieval such as would be encountered, for example, in an image search on the World Wide Web because of the limitations inherent in metadata-based systems. Presently most image searches are conducted by searching using keywords. This requires that images be located by matching the keywords in a search query to metadata associated with an image. This type of a search requires mechanisms (such as human labeling) that can describe every image via metadata which is impractical for very large databases, or for images that are generated automatically, such as, for example, from surveillance cameras.

Another reason image search, such as searching for images on the World Wide Web, is difficult is in part because a handful of keywords are generally insufficient for characterizing the visual properties of an image, such as, for example, that an image with vertical lines in it is sought. Popular search engines have begun to provide a set of automatically generated meta tags based on simple characteristics of images (such as tags for black and white images or images that contain a face), but such approaches are limited by the fact that it is unclear what tags end-users want to be able to use in examining Web image search results.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The interactive concept learning image search technique described herein allows end-users to quickly create their own rules, based on the image characteristics of images for ranking or re-ranking images returned in response to a search query. These image characteristics can include visual as well as semantic features or characteristics, for example, or a combination of both. Once one or more rules have been created end-users can then rank or re-rank any future image search results according to their rule or any combination of rules. In one embodiment of the technique end-users provide example images each rule should match and examples of images the rule should reject. The technique learns the common image characteristics of the example images as a rule or concept and can then rank or re-rank any current or future image search, image list or image database according to the learned concept.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the interactive concept learning in image search technique, reference is made to the accompanying drawings, which form a part thereof, and which is shown by way of illustration examples by which the interactive concept learning in image search technique may be practiced. It is to be understood that other embodiments may be utilized and structural changes may be made without departing from the scope of the claimed subject matter.

1.0 Interactive Concept Learning in Image Search

The interactive concept learning image search technique provides an image search application that allows end-users to quickly create their own rules for ranking or re-ranking images based on the image characteristics of the images. These image characteristics may include visual characteristics or semantic features or characteristics, or a combination of both. Any current or future image search results can then be ranked or re-ranked according to the created rule or rules. End-users provide examples of images each rule should match and examples of images the rule should reject. The technique learns the common image characteristics of the examples. Search results of any current or future image search can then be ranked or re-ranked according to one or more of the learned rules.

The interactive concept learning in image search technique can be deployed in terms of a stand alone application on a personal computer or similar computing device, within a Web page or be integrated in a Web browser.

The various embodiments of the interactive concept learning in image search technique provide for many unexpected results and advantages. For example, a user can create their own image search rules based on the image characteristics of an image they are looking for. This image search can be totally independent of any search words or metadata associated with images on the Web, in a database or on the user's computing device or an associated server. Alternately the search terms can be combined with the learned rules to create hybrid embodiments of the technique.

The interactive concept learning in image search technique can be used to search any image repository such as the World Wide Web or an image database resident on a user's computing device.

1.1 Search Environment

Figure 1:
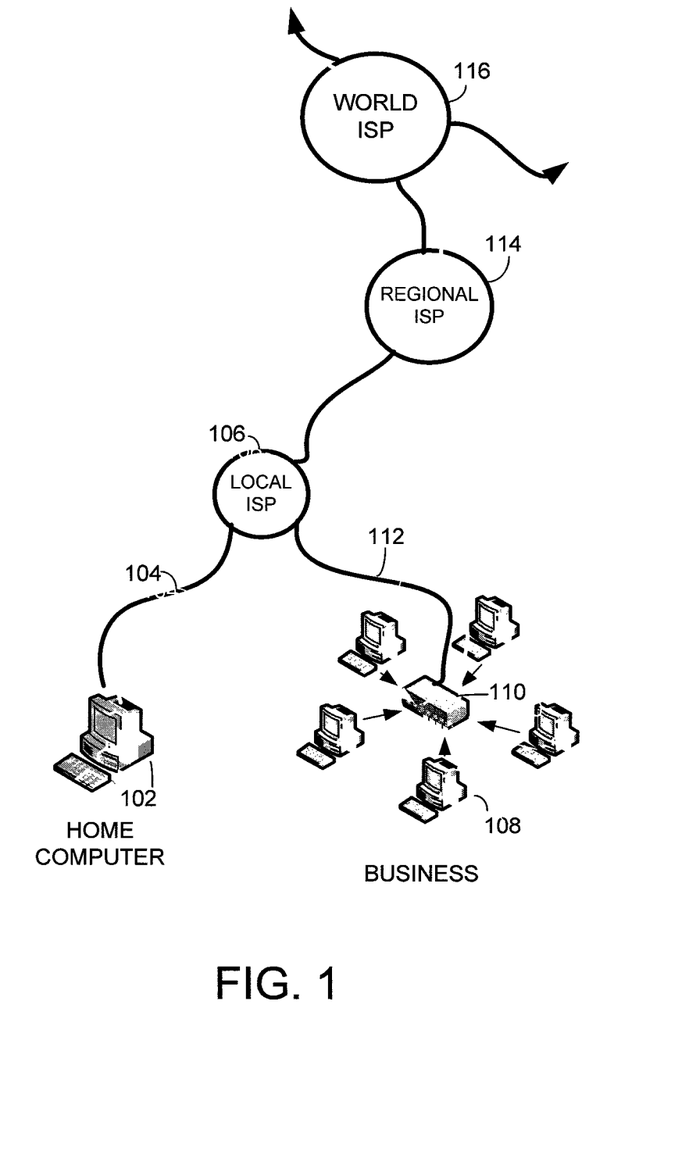
FIG. 1 provides an overview of one possible environment in which image searches are typically carried out.

FIG. 1 provides an overview of an exemplary environment in which image searches such as, for example, image searches on the Web or other network, may be carried out. Typically, a user searches for information on a topic on the Internet or on a Local Area Network (LAN) (e.g., inside a business).

The Internet is a collection of millions of computers linked together and in communication on a computer network. A personal home computer 102 may be linked to the Internet or Web using a phone line and a modem, a digital subscriber line (DSL), a wireless connection, or a cable modem 104 that talks to an Internet service provider (ISP) 106. A computer in a larger entity such as a business will usually have a network interface card (NIC) that directly connects it to a local area network (LAN) 110 inside the business. The business can then connect its LAN 210 to an ISP 106 using a high-speed phone line like a T1 line 112. ISPs then connect to larger ISPs 114, and the largest ISPs 116 maintain fiber optic "backbones" for an entire nation or region. In this way, every computer on the Internet can be connected to every other computer on the Internet.

The World Wide Web (referred sometimes as the Web herein) is a system of interlinked hypertext documents accessed via the Internet. There are millions of pages of information and images available on the World Wide Web. When a person conducting a search seeks to find information on a particular subject or an image of a certain type they typically visit an Internet search engine to find this information on other Web sites via a browser. Although there are differences in the ways different search engines work, they typically crawl the Web (or other networks or databases), inspect the content they find, keep an index of the words they find and where they find them, and allow users to query or search for words or combinations of words in that index. Searching through the index to find information involves a user building a search query and submitting it through the search engine via a browser or client-side application. Text and images on a Web page returned in response to a query can contain hyperlinks to other Web pages at the same or different Web site.

It should be noted that while the interactive concept learning in image search technique may be used to search images over a LAN 110 or on the Internet as discussed above, the technique can equally well be used to search for images on a user's computing device, such as is later discussed with respect to FIG. 5.

1.2 Exemplary Architecture

Figure 2:
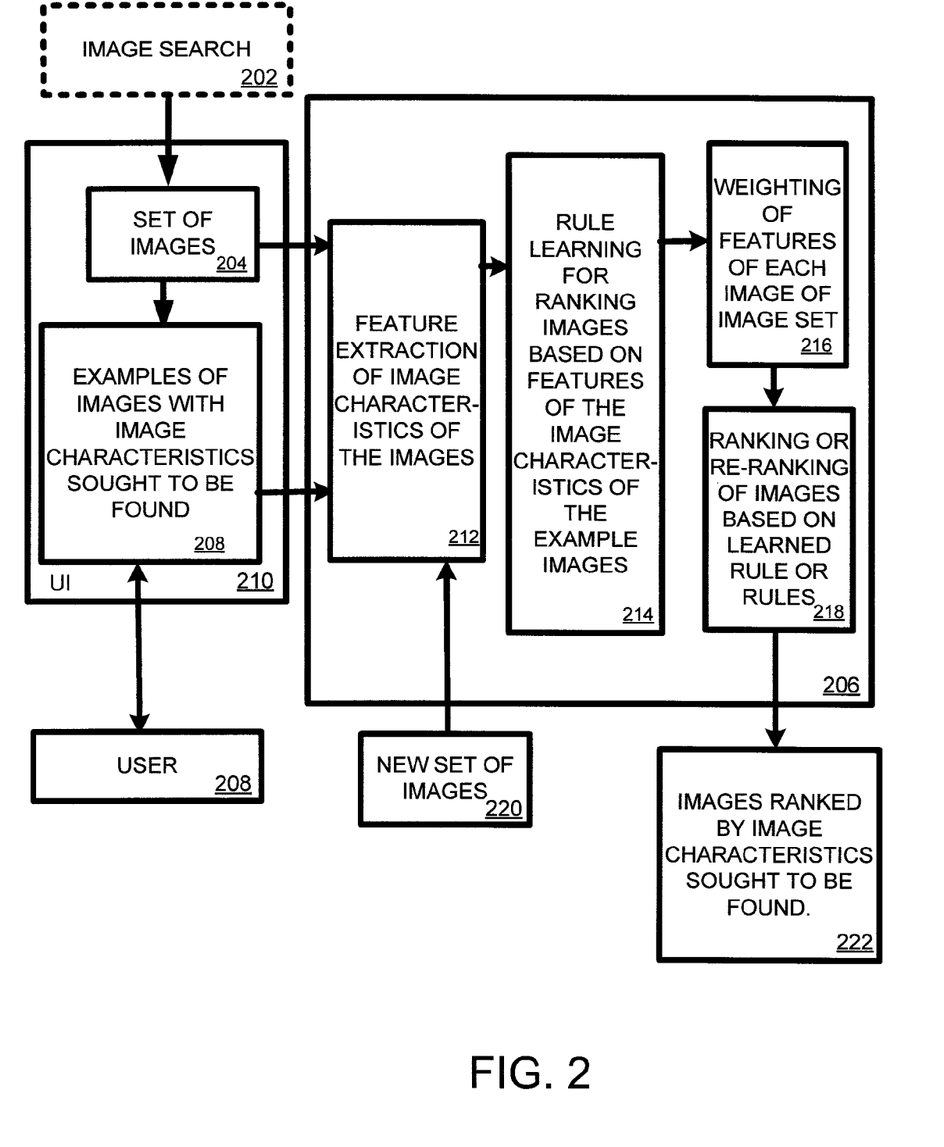
FIG. 2 is a diagram depicting one exemplary architecture in which one embodiment of the interactive concept learning in image search technique can be employed.

One exemplary architecture 200 (residing on a computing device 500 such as discussed later with respect to FIG. 5) in which the interactive concept learning in image search technique can be employed is shown in FIG. 2. To acquire a set of images 202, an image search 202 can be employed, which processes search queries that are typically input into a search engine via a browser. The Web browser is a software application that enables a user to display and interact with text, images, and other information typically located on a Web page at a Web site on the World Wide Web or other network. The search query typically returns a set of search results which are displayed to a user and manipulated by the user via a User Interface 210.

The interactive concept in learning image search technique module 206 interfaces with the user interface (UI) 210, which interfaces with a browser and search engine and displays to the user a set of images returned from the search or other image database 202 and which also allows the user to provide examples of images with the image characteristics sought to be found (or examples of images that do not have the image characteristics sought to be found) 208. The interactive concept learning in image search module 206 of the technique learns rules or concepts regarding the type of images a user is trying to find based on the image characteristics of the example images and rearranges the images returned in a search (either the images returned in response to the present search or a new set of images 220 of a future search) in accordance with the learned rules. The rule or concept learning involves extracting features of the image characteristics of the images of the image set and the example images in a feature extraction module 212. A rule learning module 214 attempts to learn a rule by ranking images of the image set based on the features of the image characteristics of the example images. This involves weighting the features of each image of the image set in a feature weighting module 216. The images of the image set are then ranked or re-ranked based on the learned rule or rules in a ranking module 218. The ranked images may be stored in a re-ranked image database 222.

Figure 3:
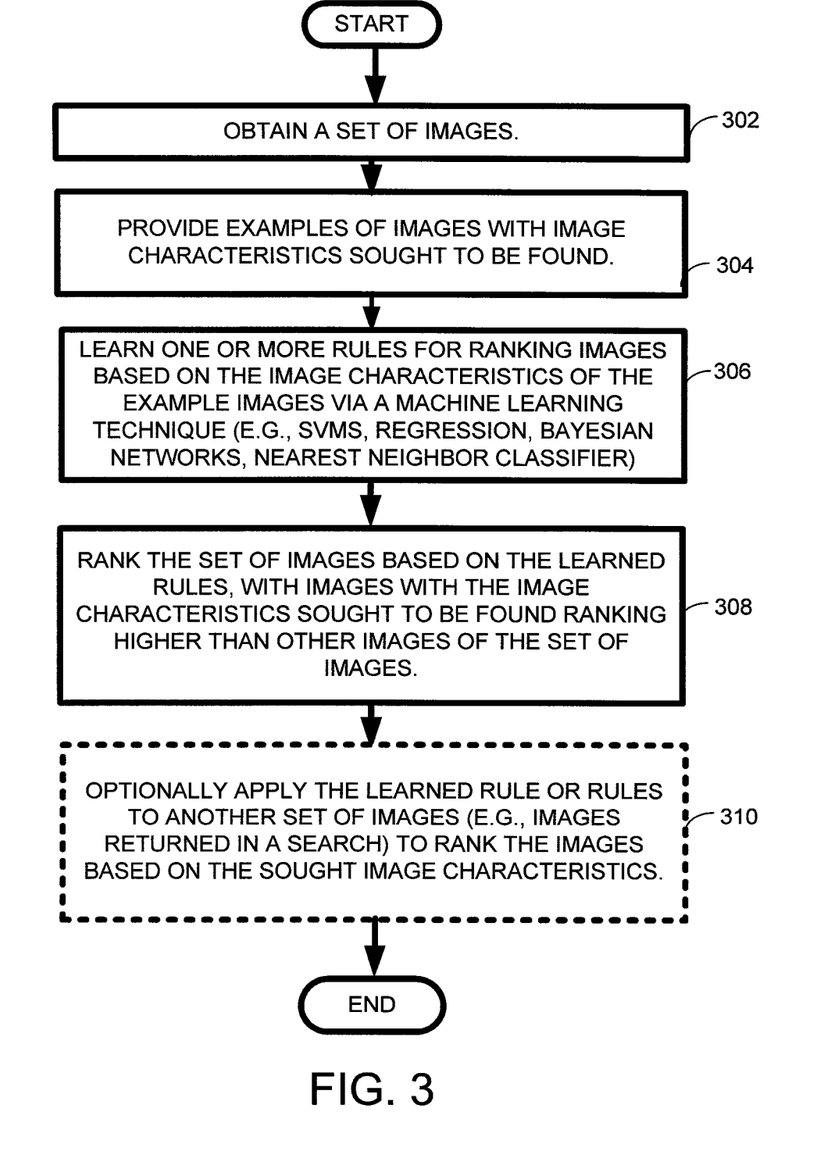
FIG. 3 is a flow diagram depicting a generalized exemplary embodiment of a process employing one embodiment of the interactive concept learning in image search technique.

1.3 Exemplary Process Employing the Interactive Concept Learning in Image Search Technique A general exemplary process employing the interactive concept learning in image search technique is shown in FIG. 3. In a very general sense, this embodiment of the technique operates as follows. A set of images is obtained (box 302). This set of images can be obtained, for example, by searching for them by keyword on a network, or by searching for them on a user's computing device. Examples of images with image characteristics sought to be found are provided (box 304). For example, these example images can be selected from the set of images returned in response to the aforementioned search by a user. Rules or concepts that specify which type of images are to be found (which images are to be ranked more highly in a set of images) are learned via a machine learning technique based on the provided example images (box 306). Various machine learning techniques may be used, such as, for example, Support Vector Machines (SVMs), regression, Bayesian networks, or nearest neighbor classifiers. The learned rules or concepts can then be employed for ranking or re-ranking images, such as those found in an image search, based on their image characteristics (box 308). Images with image characteristics sought to be found are ranked higher than images without the image characteristics sought to be found. The learned rule or concepts can also be applied to another set of images (for example, images returned in a new search or in a different image database) based on the sought image characteristics (box 310).

Figure 4:
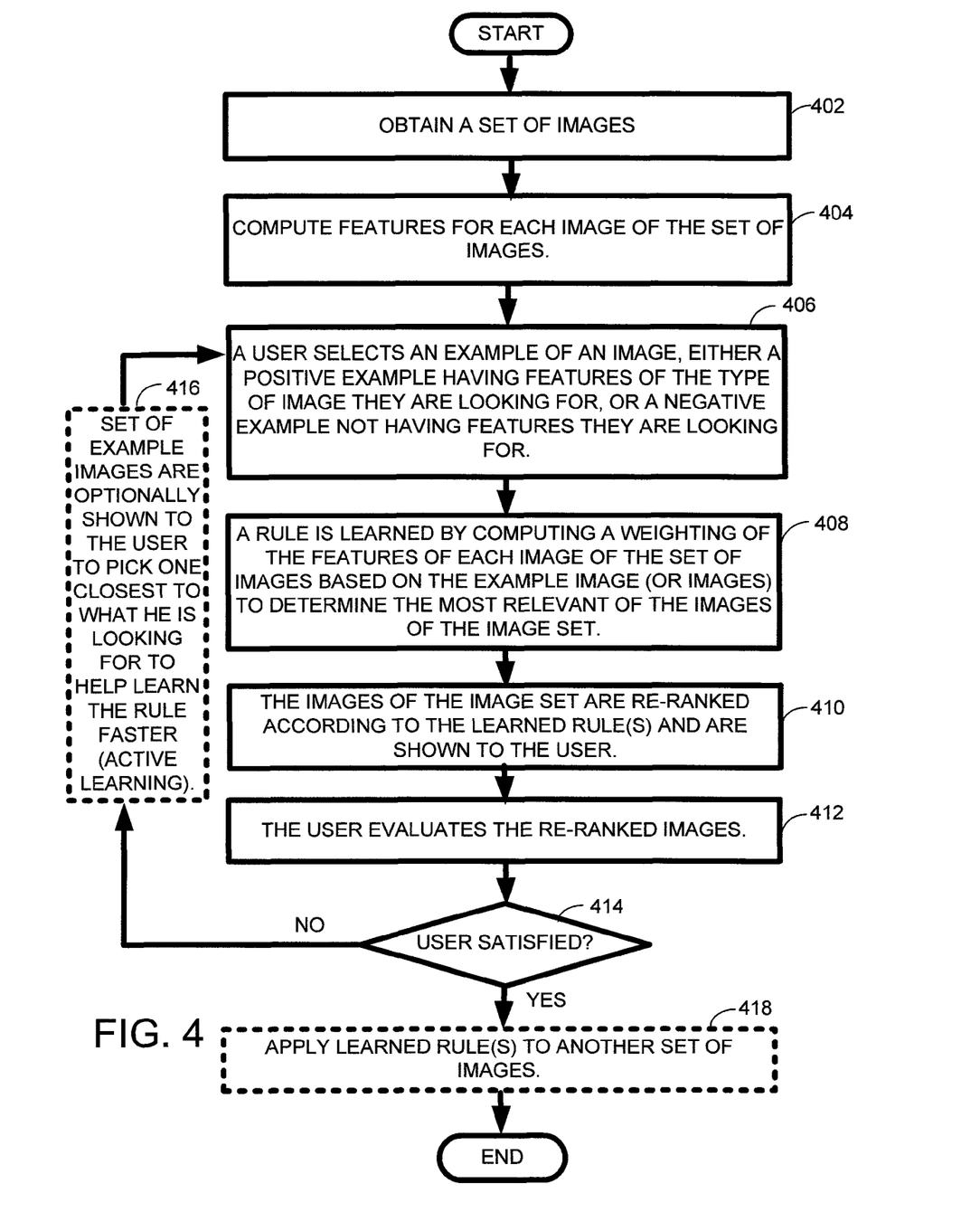
FIG. 4 is a flow diagram depicting another exemplary embodiment of a process employing one embodiment of the interactive concept learning in image search technique.

Another more detailed exemplary process employing the interactive concept learning image search technique is shown in FIG. 4. A set of images is obtained (box 402). A number of features, such as, for example, visual features are computed for each of the set of images (box 404). A user then selects an example of an image, either a positive example having features of the type of image that they are looking for, or a negative example not having features of the type of image they are looking for (box 406). (It should be noted that user can continue to provide positive or negative examples to the rule even if they apply the rule to other search queries. In fact, continuous training like this is sometimes important in making a rule as robust as possible.) A concept or rule is learned by computing a weighting of features of each image of the set of images based on the example image (or images) provided to determine the most relevant of the images of the image set (box 408). The images of the image set are then re-ranked according to the computed weighting and shown to the user (box 410). The user evaluates the re-ranked images (box 412) and if not satisfied with the re-ranked images (box 414) provides an additional example image (box 406). This continues until the user is satisfied that the most relevant images of the re-ranked images contain one or more images that the user is looking for. It should be noted that it is also possible to provide the user with a selected set of example images for the user to specify which image is more like the one they are looking in order to speed the process of determining the most relevant images (e.g., those images with the sought after image characteristics (box 416) (e.g., active learning as will be discussed in detail later). Additionally, it is also possible to apply the learned rule or rules to a totally different set of images if desired (box 418).

1.4 Exemplary Embodiments

Various alternate embodiments of the interactive concept learning in image search technique can be implemented.

One exemplary embodiment of the interactive concept learning in image search technique can be implemented as an application that retrieves images from a keyword-based Web image search engine, although the technique can equally well be applied to perform image searches of images stored on the desktop computer or other computing device. The interactive concept learning in image search technique enables the ranking or re-ranking of image search results or images in an image database according to user-created rules based on the image characteristics of the images.

In one embodiment of the interactive concept learning in image search technique, each rule is defined as a nearest-neighbor classifier, computing a score that indicates how similar an image is to the examples that were used to train that rule. The training of such rules requires learning a distance function from the examples provided by an end-user. In order to help end-users provide informative examples that help the interactive concept learning in image search technique determine what rule the user is creating, in one embodiment, the interactive concept learning in image search technique implements active learning criteria to help a user provide good examples for learning the rules. Details of these and other implementations of the interactive concept learning in image search technique are discussed in greater detail below.

It should be noted that many alternative embodiments to the discussed embodiments are possible, and that steps and elements discussed herein may be changed, added, or eliminated, depending on the particular embodiment. These alternative embodiments include alternative steps and alternative elements that may be used, and structural changes that may be made, without departing from the scope of the disclosure.

1.4.1 Image Queries to Obtain a Set of Images

In one exemplary embodiment, as shown in FIG. 2, the interactive concept learning in image search technique programmatically retrieves images using queries to conduct an image search 202 using any of a number of search engines. In one embodiment of the technique, a format parameter in the query indicates that the engine should return its results list in an XML format, and the interactive concept learning in image search technique downloads the thumbnail images for each image (although full sized images could also be used with the technique). The image characteristics of each image returned in response to the search query are analyzed 212 as they are downloaded, and the resulting images are ranked according to any active learned rules 214, 216. Alternatively, the image characteristics of images can be analyzed when the web crawler first finds and indexes the image, and these characteristics need only be downloaded, rather than computed, when the search results are downloaded.

1.4.2 Ranking Image Results in Accordance with Learned End-User Rules

As discussed previously, images are ranked or re-ranked by applying a set of end-user created rules. In one exemplary embodiment of the technique, users can enable and disable the learned rules or concept (for example, in one exemplary user interface by moving them between Active Rule and Available Rule panes on the display of the user interface 210). In one embodiment the user 208 can also change the relative weight of one rule of a set of rules. For example, in one exemplary user interface 210 a slider control on each active rule allows the user to control the relative weighting of multiple rules. In this embodiment, every active rule computes a score for each image, and scores are multiplied by a weighting, such as, for example, between −1 and 1. Images are thus ranked by a weighted sum of scores. Mathematically the image score of an image i can be expressed as:

$$ImageScore(i) = \sum_{r \in ActiveRules} weight_r * score_r(i).$$

where $weight_r$ is the weight of the rule and $score_r(i)$ is the score of the image i for the rule r.

1.4.3 Applying Concept Rules Via Nearest-Neighbor Classifier.

In one embodiment of the interactive concept learning in image search technique each rule is learned via a nearest-neighbor classifier. Each rule is defined as a set of positive examples (images illustrating what the rule should match), a set of negative examples (images illustrating what the rule should reject), and a distance metric. Given these parameters, a rule scores a new image of an image set by computing the distance between that image and each positive or negative example image, then dividing the distance to the nearest positive example by the sum of the distance to the nearest positive and nearest negative example. Mathematically the score of an image for a given rule can be expressed as:

$$score_r(i) = 1 - \frac{mindist_P}{mindist_P + mindist_N}$$

where $mindist_P$ is the minimum distance between the image and a positive example image and $mindist_N$ is the minimum distance between the image and a negative example image. Note that $score_r(i)$ ranges between 0 and 1, approaching 1 when i is near a positive example and far from negative examples, having value 0.5 when i is equally close or far from the nearest positive and negative examples, and approaching 0 when i is near a negative example and far from positive examples. For its distance metric, the interactive concept learning in image search technique uses a weighted sum of a set of several component distance metrics:

$$Distance(i, j) = \sum_{m \in metrics} weight_m * distance_m(i, j)$$

where the overall distance between two images is described by the sum of distances of each metric weighted by their relative importance. The weights are the factor that is learned (as described below) and the set of these uniquely defines each rule.

Given this approach, the core of this embodiment of the technique's ability to re-rank images according to their image characteristics lies in a set of component distance metrics and the interactive concept learning in image search technique's ability to learn how to weight those different metrics.

1.4.3.1 Distance Metrics

In one embodiment, the interactive concept learning in image search technique implements image distance metrics, for example, based on histograms of hue, saturation, and luminosity of pixels, an edge histogram, a global shape histogram, and a texture histogram. The technique computes and stores these histograms for each image, using them to efficiently compute distances between images.

In this embodiment, the hue, saturation, luminosity, and edge histograms are computed over the pixels in each thumbnail image and normalized to account for thumbnails of varying size (or full-sized images if full-sized images are used). In this embodiment, two distance metrics are defined for each histogram. The first distance metric is the quadratic distance between two histograms, a measure of histogram distance that accounts for the similarity between different bins in the histogram. In the case of the luminosity histogram, for example, an image entirely of luminance 1.0 is considered more similar to an image entirely of luminance 0.8 than it is to an image entirely of luminance 0.4 (the simpler Euclidean comparison would treat the two images as equally dissimilar from the first, provided the three luminosity values are in different histogram bins). The second metric for each image's histograms is the difference in histogram entropy.

In this embodiment, a histogram is also computed representing the overall structure of each image by applying a shape descriptor to the entire image. This descriptor sums local image gradients into bins over a log-polar target-shaped region covering the entire image, normalizing the resulting histogram. Similar histograms (using Euclidean distance) correspond to images with similar overall structure, and the descriptor offers a degree of invariance to illumination, translation, scale, and rotation. For example, this distance metric will generally indicate that two frontal close-ups of a face are similar and that two driver-side views of a car are similar. It will also generally indicate that a close-up of a face is different from a view of a car. The shape descriptor does not consider color, and so it complements the color histogram metrics.

Finally, a texture histogram is computed that preserves less geometric information than the global shape histogram but allows discrimination between the distribution of structures present in an image without regard to their arrangement. In one embodiment a bag-of-words approach is applied that samples a number of patches from the image. For efficiency, samples on a regular grid of partially overlapping blocks and computes a descriptor for each block. An offline recursive clustering analysis of a large image database is used to learn a set of discriminative textures, and a histogram is computed at runtime by resolving each sampled block to a bin based on the identified discriminative textures. Less formally, this metric considers images similar if they contain similar patches. It might consider images of two different city skylines to be similar, while the previously discussed global shape descriptor might consider the two skylines different.

In other embodiments of the technique, non-visual distance metrics, such as keywords can also be included as distance metrics. Many search engines index and return multiple keywords with each piece of content. Hence, if for example "car" were the keyword used to retrieve a set of images, each of those images will also have other keywords associated with it, such as "blue, 4-wheel drive, porsche" for one image or "yellow, convertible, fast" for another. In practice, while the focus is mostly on image characteristics in this disclosure, any characteristics that are associated with images or content can be used.

1.4.3.2 Learning Over Distance Metrics

As discussed previously, the interactive concept learning in image search technique learns rules from positive and negative examples of images that rule should match or reject. Given a set of positive examples, there are many concepts a person might be attempting to specify. In most applications of nearest-neighbor algorithms, the developer of a system carefully tunes a distance function based on their knowledge of the problem being solved. However, with the current technique it is not known beforehand what notion of similarity will be appropriate for an end-user's rule. If an attempt is made to treat all distance metrics equally, dimensionality guarantees a very large number of images will be required in order to specify even the simplest rules. As previously discussed with respect to FIG. 2, the interactive concept learning in image search technique therefore, in one embodiment, defines a concept or rule learning problem as a matter of learning a set of weights 216 based on which distance metrics best correspond to the provided examples. The interactive concept learning in image search technique can learn, for example, whether a set of images are similar because of their color histogram, their global shape descriptor, or a combination of the two. One method for learning these weights is described next.

Given a set of positive and negative examples, one embodiment of the interactive concept learning in image search technique learns a set of distance metric weights such that the distance between two images with the same label (positive or negative) is minimized and the distance between two images with different labels is maximized. Specifically, an objective function that separates the two classes as much as possible is minimized while keeping examples of the same class close together. Mathematically this can be described as:

$$f(\text{weights}) = \sum_{i,j \in Pos} D(i,j) + \sum_{i,j \in Neg} D(i,j) + \sum_{i \in All} \ln \sum_{j \in all} e^{-D(i,j)}$$

The first two terms of the previous equation correspond to within-class distances, thus the minimization of the function favors weights that minimize the distance between data of the same class. The third term considers all examples and favors maximum separation. The combination of terms thus favors weights that collapse each of the classes while maximizing the distance between data with different labels. The function is convex, and the unique global minimum is efficiently found using standard non-linear optimization techniques.

Less formally, the interactive concept learning in image search technique learns what notions of distance are relevant based on the examples that a user has provided. For example, if all of the provided positive examples are mostly yellow, and they have no other common characteristics, and the negative examples are not mostly yellow, the interactive concept learning in image search technique will learn that hue histogram similarity is the relevant distance (giving it a large weight and other distance metrics small weights). The resulting rule will give high scores to images with hue histograms similar to those of the positive examples used to train the rule. In a situation where the positive examples have multiple characteristics in common, those characteristics will each receive some weighting.

1.4.4 Active Learning to Provide Better Example Images

As discussed previously, for example with respect to FIG. 4, because it might sometimes be difficult to determine what images an end-user should provide as examples in order to help the interactive concept learning in image search technique learn the correct concept or rule, the interactive concept learning in image search technique uses active learning techniques 416 to identify images from the set of images returned from the current query that provide the most information about the rule a person is creating. In general, in this aspect of the technique, in one embodiment, two or more images about which the technique is most confused are provided to a user to select which of the images most readily represents the rule or concept the user is attempting to establish.

In one embodiment, the interactive concept learning in image search technique's first active learning procedure finds images of the image set that, given the current set of learned distance weights, are closest to the boundary between positive and negative. These are the images about which the technique is most uncertain, so labeling them provides the most information within the space defined by the current distance weights. In one embodiment, mathematically, the interactive concept learning in image search technique selects images with the smallest value:

$$\text{uncertain}(i) = \text{abs}(\text{mindist}_P - \text{mindist}_N)$$

The interactive concept learning in image search technique's second active learning procedure finds images of the image set that will result in the exploration of new weightings of the distance metrics. For one embodiment of the interactive concept learning in image search technique, activedistance(i), a heuristic based on data density and uncertainty, selecting images with the smallest value, is applied:

$$\text{activedistance}(i) = (\text{mindist}_P + \text{mindist}_N) * \text{uncertain}(i)$$

The intuition behind this heuristic is to find images that are in dense portions of the space (near other labeled examples) but are still very uncertain. The first term captures density, as the distance to positive and negative examples will be lower in dense portions of the space. The second term captures uncertainty, as discussed in the previous paragraph. Images with low scores are selected, and labeling those images gives the interactive concept learning in image search technique new information to use in finding a weighting of distance metrics that pushes positive and negative examples away from each other.

1.4.4.1 User Interface Condition Considerations

There are various considerations on how the technique should present data to the user. When a user edits a concept or rule by providing new example images, how the user interface presents the effect of a rule on the current image set is a consideration. There are two dimensions of one embodiment of the rule editing user interface that deserve careful attention. The first dimension, herein called Editing Presentation, is how the interface presents the effect of a rule on the current image set while that rule is being edited. The second, herein called Active Learning Presentation, is how the interface presents the examples identified by the active learning procedures. Crossing these two dimensions yields six possible user interface embodiments of the interactive concept learning in image search technique.

1.4.4.1.1 Editing Presentation: Displaying the Ranked Images

As a rule or concept is being edited, the technique needs to present what rule has been learned. Presenting the positive and negative examples that form the basis for the rule is straightforward.

The previously discussed learned distance metric weights can be illustrated by showing the images in the current query results or image set ranked according to the rule being edited. Editing Presentation considers whether the technique should show the entire set of images as they are ranked by the rule that is being edited (Single), or show only a small subset of the images, those that rank at the very top and those that rank at the very bottom (Split).

The Single approach to displaying the ranked images provides the end-user with access to the entire set of images from the current query, so they have more images to choose from in training the rule. But the rule is unlikely to ever be completely perfect, so a person may become overly focused on the noisy boundary between positive and negative images, continuing to provide training examples that are no longer noticeably improving a rule.

The Split approach to displaying the ranked images avoids the possibility of continuing to provide training examples that are no longer noticeably improving a rule, as end-users can provide training examples only until the small subset of images displayed from the top of the ranking match the desired concept and the small subset of images displayed from the bottom of the ranking are examples of images that have been correctly rejected. This comes at the cost that fewer images are available to choose from when providing training examples.

1.4.4.1.2 Active Learning Presentation: Displaying Active Learning Examples A similar tradeoff is explored in considering how to present images selected by the technique's active learning procedures.

These images, by definition, will exist in the most uncertain regions of the image query space. They may therefore either help a participant quickly find effective examples, or their presence may lead a participant to continue providing examples even after they are no longer noticeably improving a rule. Active Learning Presentation considers whether the interactive concept learning in image search technique should place active learning images in a separate pane (Explicit), randomly distribute active learning images near the top and bottom of a set of results in the hope of them being visually distinct from the nearby images may lead active learning images to be selected for use as a positive or negative example (Embedded), or rely only upon the ranked query results (None).

1.4.4.1.3 User Interface Conditions for Optimum Rule Editing and Active Learning Image Presentation In one embodiment of the interactive concept learning in image search technique, crossing these two dimensions of Active Learning Presentation and Editing Presentation discussed above yields six user interface conditions as discussed below which should be considered in designing a user interface for various embodiments of the technique.

Split-Explicit.

In the case where only the top and bottom ranked images are displayed and active learning images are explicitly displayed, in one embodiment of the technique the split-explicit condition uses three scroll panes to display this data to the user. In one exemplary embodiment, these three panes present the 1) 50 top-ranked images, 2) 10 images selected by the technique's active learning procedures, and 3) the 50 bottom-ranked image results.

Split-Embedded.

In the case where only the top and bottom ranked images of the image set are displayed and the active learning images are embedded images, in one embodiment the split-embedded condition user interface uses two scroll panes to display the data. In one embodiment, the first pane presents the 50 top-ranked results, as well as 5 randomly-seeded active learning images. The second pane presents the 50 bottom-ranked results, as well as 5 randomly-seeded active learning results.

3) Split-None.

In one embodiment, in the case where only the top and bottom ranked images are displayed and no active learning images are shown, the split-none technique uses two scroll panes. In one embodiment these panes present the 50 top-ranked results and the 50 bottom-ranked results.

4) Single-Explicit.

In one embodiment in the case where the technique provides the end-user with access to the entire set of images so that they have more images to choose from in training the rule and the active learning images are explicitly displayed, the split-explicit condition uses two scroll panes. Ten active learning results are displayed in one scroll pane. The other pane displays the remainder of the ranked images of the image set.

5) Single-Embedded.

In one embodiment in the case where the technique provides the end-user with access to the entire set of images so that they have more images to choose from in training the rule and the active learning images are embedded, the single-embedded condition uses one scroll pane. This condition seeds the top and bottom of the rankings with active learning results using the same procedure as the Split-Embedded condition and then displays the entire modified ranking in one scroll pane.

6) Single-None.

In one embodiment in the case where the technique provides the end-user with access to the entire set of images so that they have more images to choose from in training the rule and no active learning images are shown, the single-none condition uses one scroll pane. It displays all of the ranked query images.

Additionally, in one embodiment, users are shown the actual distance metrics and the weights associated with them (i.e. which ones the system has selected as important). Users can then manually edit these, for example, indicating that they did not mean for "color" to be an important metric, but rather "shape".

2.0 The Computing Environment

The interactive concept learning in image search technique is designed to operate in a computing environment. The following description is intended to provide a brief, general description of a suitable computing environment in which the interactive concept learning in image search technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, mini-computers, mainframe computers, distributed computing environments that include any of the above systems or devices, and the like.

Figure 5:
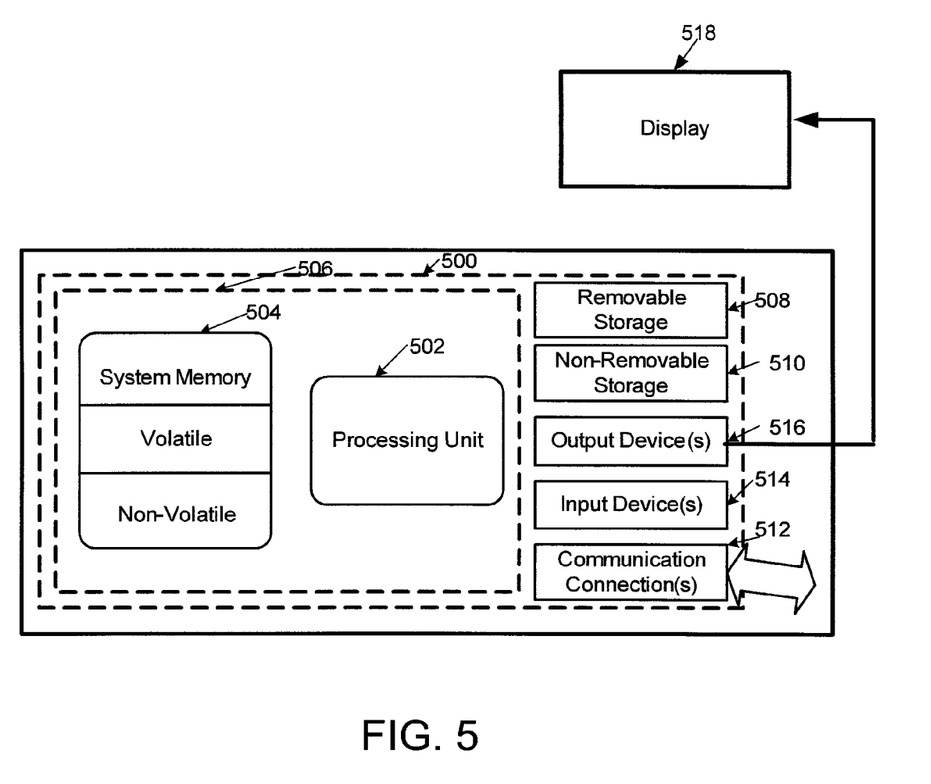
FIG. 5 is a schematic of an exemplary computing device in which the present interactive concept learning in image search technique can be practiced.

FIG. 5 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 5, an exemplary system for implementing the interactive concept learning in image search technique includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 has a display 518, and may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may have various input device(s) 514 such as a keyboard, mouse, pen, camera, touch input device, and so on. Output device(s) 516 such as speakers, a printer, and so on may also be included. All of these devices are well known in the art and need not be discussed at length here.

The interactive concept learning in image search technique may be described in the general context of computer-executable instructions, such as program modules, being executed by a computing device. Generally, program modules include routines, programs, objects, components, data structures, and so on, that perform particular tasks or implement particular abstract data types. The interactive concept learning in image search technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. For example, even though some of the described embodiments use the visual characteristics to learn the rule or rules to rank the images found in a search, the visual characteristics could also be combined with the keywords of the search to learn the rule or rules to rank the images of an image set to create a hybrid embodiment to rank the images found in a search. The specific features and acts described above are disclosed as example forms of implementing the claims.

Wherefore, what is claimed is:

1. A computer-implemented process that finds one or more images of sought image characteristics, comprising:
   obtaining a set of images;
   receiving user-selected example images from the set of images with sought visual image characteristics;
   interactively learning one or more weighted user-created rules for ranking images based only on the visual image characteristics of the user-selected example images that each rule matches and each rule rejects via a machine learning technique using a set of image histograms for each image of the image set, the overall structure of each image of the image set and the texture of each image of the image set, wherein each rule is based on learning a distance metric which computes a score for each image returned in the set of images that indicates how similar each image returned in the set of images is to the examples of images with image characteristics sought comprising:
      computing a set of image histograms computed over the pixels in each image in the set of images;
      computing two distance metrics for each histogram of the set of image histograms;
      computing a structure histogram that represents the overall structure of each image in the set of images by applying a shape descriptor to the whole image;
      computing a texture histogram for each image in the set of images; and
      using the computed image histograms, the distance metrics for each of the computed image histograms, the structure histogram and the texture histogram for each image to compute a score for each image in the set of images that indicates how similar each image in the set of images is to the example images with image characteristics sought and example images not having image characteristics sought;
   displaying image distance metrics and weights for each of the one or more learned rules on a display;
   changing one or more of the rules based on an edit to a displayed image distance metric or weight received from a user; and
   ranking the set of images based only on the sought visual image characteristics and the one or more interactively learned user-created changed rules.

2. The computer-implemented process of claim 1 further comprising applying the one or more interactively learned user-created changed rules to a second set of images.

3. The computer-implemented process of claim 1 further comprising combining two or more learned user-created rules based on the visual characteristics before ranking the set of images.

4. The computer-implemented process of claim 1 further comprising obtaining the set of images in response to a search query submitted over a computer network.

5. The computer-implemented process of claim 1 further comprising obtaining the set of images by locally searching for images on a computing device.

6. The computer-implemented process of claim 1, further comprising repeating the actions of:
   providing examples of images with visual image characteristics sought;
   interactively learning one or more user-created rules for ranking images based only on the visual image characteristics of the example images selected by a user via a machine learning technique; and
   ranking the set of images based on the one or more learned user-created rules;
   until the images of the set of images are ranked with the images with image characteristics sought being ranked highest.

7. The computer-implemented process of claim 1 further comprising learning the one or more rules for ranking images based on a set of distance metrics that are used to represent the distance of any given image to any other given image.

8. The computer-implemented process of claim 1 wherein the two distance metrics comprise:
   the quadratic distance between the image histograms of two images; and
   the distance in histogram entropy between two images.

9. The computer-implemented process of claim 1 further comprising:
   showing the ranked images to a user;
   the user evaluating the ranked images;
   the user selecting one or more example images to learn the rule until the most relevant images of the ranked images contain one or more images that the user is seeking.

10. A system that finds one or more images of sought image characteristics, comprising:
    a computing device;
    a computer program comprising program modules executable by the computing device, wherein the computing device is directed by the program modules of the computer program to,
    obtain a set of images;
    receive user-selected example images with sought visual image characteristics;
    interactively learn one or more weighted user-created rules for ranking images based only on the visual image characteristics of the user-selected example images that each rule matches and each rule rejects via a machine learning technique using a set of image histograms for each image of the image set, the overall structure of each image of the image set and the texture of each image of the image set, wherein each rule is based on learning a distance metric which computes a score for each image returned in the set of images that indicates how similar each image returned in the set of images is to the examples of images with image characteristics sought comprising:
       computing a set of image histograms computed over the pixels in each image in the set of images;
       computing two distance metrics for each histogram of the set of image histograms;

computing a structure histogram that represents the overall structure of each image in the set of images by applying a shape descriptor to the whole image;

computing a texture histogram for each image in the set of images; and using the computed image histograms, the distance metrics for each of the computed image histograms, the structure histogram and the texture histogram for each image to compute a score for each image in the set of images that indicates how similar each image in the set of images is to the example images with image characteristics sought and example images not having image characteristics sought;

display weights and image distance metrics for each of the weighted user-created rules on a display;

change one or more of the weighted user-created rules by using user-initiated manual changes to a displayed weight or image distance metric;

rank the set of images based on the one or more of the changed rules; and display the ranked images of the image set to the user.

11. The system of claim 10 further comprising a user interface which displays the ranked images of the image set and provides positive and negative examples for the user to choose to speed the learning of the rule.

12. The system of claim 10 wherein the multiple user-created rules are displayed and wherein a slider control allows a user to control the weighting of the multiple rules.

13. The system of claim 10 wherein a small subset of the ranked images is displayed to the user, those that rank at the very top and those that rank at the very bottom.

14. A system that finds one or more images of sought image characteristics, comprising:

a computing device;

a computer program comprising program modules executable by the computing device, wherein the computing device is directed by the program modules of the computer program to, obtain a set of images;

receive user-selected example images with sought visual image characteristics;

interactively learn one or more weighted rules for ranking images based on the visual image characteristics of the example images that each rule matches and each rule rejects using a set of image histograms for each image of the image set, the overall structure of each image of the image set and the texture of each image of the image set, wherein each rule is based on learning a distance metric which computes a score for each image returned in the set of images that indicates how similar each image returned in the set of images is to the examples of images with image characteristics sought comprising:

computing a set of image histograms computed over the pixels in each image in the set of images;

computing two distance metrics for each histogram of the set of image histograms;

computing a structure histogram that represents the overall structure of each image in the set of images by applying a shape descriptor to the whole image;

computing a texture histogram for each image in the set of images; and using the computed image histograms, the distance metrics for each of the computed image histograms, the structure histogram and the texture histogram for each image to compute a score for each image in the set of images that indicates how similar each image in the set of images is to the example images with image characteristics sought and example images not having image characteristics sought;

display weights and image distance metrics for each of the weighted rules on a display;

initiate a change to one or more of the weighted rules by using user-initiated changes to a displayed weight or displayed image distance metric;

rank the set of images based on the one or more of the changed rules; and display the ranked images of the image set to the user.

15. The system of claim 14 wherein all ranked images for a given rule are displayed.

16. The system of claim 14 wherein only a subset of the top ranked images and the bottom ranked images are displayed for a given rule.

17. The system of claim 14 wherein the module for interactively learning one or more weighted rules for ranking images learns whether images are similar because of their color histogram, their global shape descriptor or a combination of their color histogram and global shape descriptor.

18. The system of claim 14 wherein a distance metric between two images with the same labels is minimized and a distance between two images with different labels is maximized.

* * * * *